United States Patent [19]
Michaud

[11] Patent Number: 5,238,258
[45] Date of Patent: Aug. 24, 1993

[54] MOTORCYCLE SIDE CAR FRAME

[76] Inventor: Ghislain Michaud, 610, Rang 6, Laurierville, Québec, Canada, G0S 1P0

[21] Appl. No.: 740,111

[22] Filed: Aug. 5, 1991

[51] Int. Cl.$^5$ .............................................. B62K 27/12
[52] U.S. Cl. ..................... 280/203; 180/210
[58] Field of Search ..................... 280/203, 111, 112.2; 180/209, 210

[56] References Cited

U.S. PATENT DOCUMENTS

| | | | |
|---|---|---|---|
| 2,702,196 | 2/1955 | Gamaunt | 280/203 |
| 2,793,051 | 5/1957 | Izumi | 280/203 |
| 3,960,391 | 6/1976 | Vetter et al. | 280/203 |
| 4,022,483 | 5/1977 | Wallick et al. | 280/203 |
| 4,078,815 | 3/1978 | Vetter | 280/203 |
| 4,254,965 | 3/1981 | Kobel | 280/203 |
| 4,385,770 | 5/1983 | Mitchell | 280/203 |
| 4,415,056 | 11/1983 | Smith | 180/210 |
| 4,477,097 | 10/1984 | Hayes | 280/203 |
| 4,548,419 | 10/1985 | Pigott et al. | 280/203 |

FOREIGN PATENT DOCUMENTS

| | | | |
|---|---|---|---|
| 1050071 | 3/1979 | Canada . | |
| 0352132 | 1/1990 | European Pat. Off. | 280/203 |
| 789634 | 11/1935 | France | 280/203 |

Primary Examiner—Margaret A. Focarino
Assistant Examiner—C. Mattix
Attorney, Agent, or Firm—Pierre Lespérance; Francois Martineau

[57] ABSTRACT

A side car for a motorcycle, wherein the side car box overlies the side car wheel directly thereabove. The lateral coupler between the side car and the motorcycle biases the side car wheel to incline interiorly of a curve, together with the motorcycle wheels, upon the moving vehicle taking a curve on a road. The side-car frame and box axially roll with the wheel, whereby the side-car center of gravity remains continuously within the plane of its wheel. As the motorcycle wheels progressively axially roll, their angular value relative to the vertical plane will increase relative to a second angular value corresponding to the roll of the side-car wheel relative to the vertical plane.

11 Claims, 3 Drawing Sheets

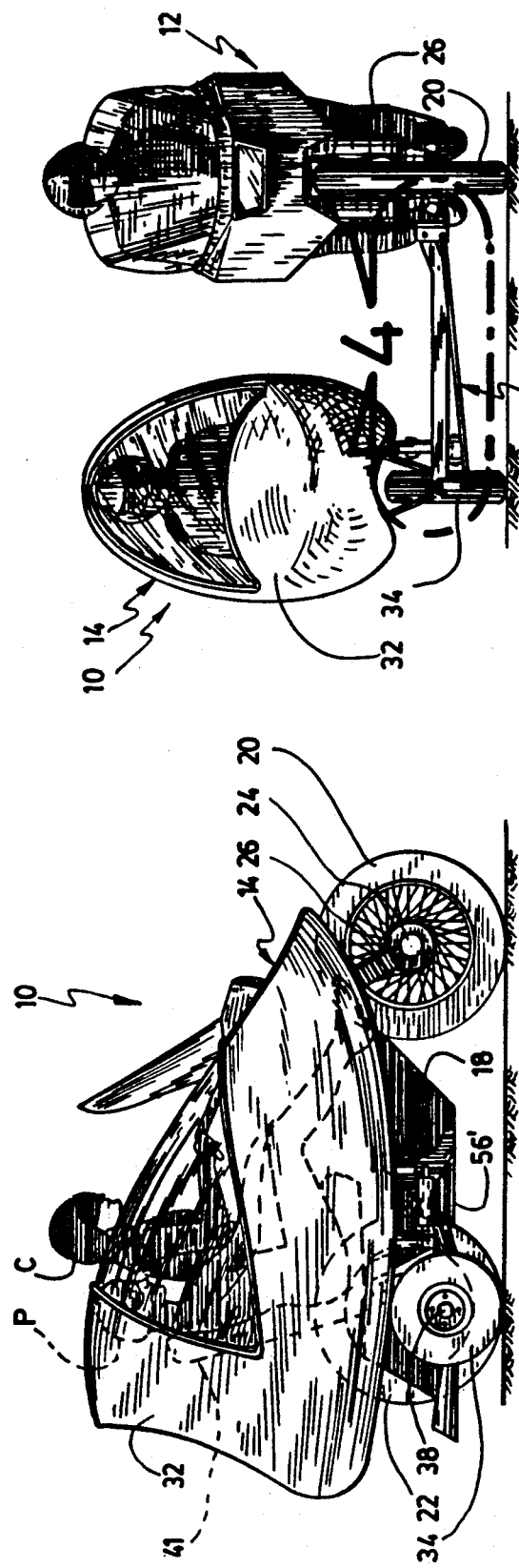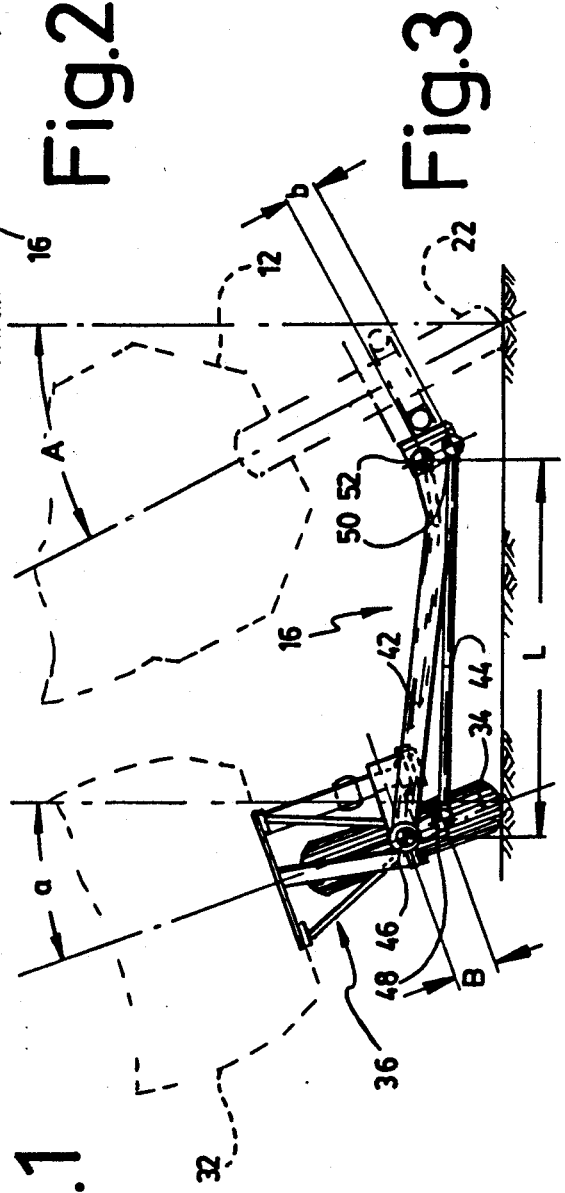

MOTORCYCLE SIDE CAR FRAME

FIELD OF THE INVENTION

This invention relates to side cars for motorcycles, particularly those having a wheel whose roll angle is variable and adjustable as a function of the roll angle of the moving motorcycle coupled thereto, when the latter negotiates a bend on a road.

BACKGROUND OF THE INVENTION

A motorcycle is a vehicle which has excellent handling features but whose loading capability is somewhat restricted. A passenger may sit beneath the motorcycle driver, on the same bench as him, but this is an uncomfortable arrangement for travel of long distances on the road. Furthermore, such a seating arrangement is not even desirable in several instances, e.g. when the passenger is a female dressed with a skirt or dress.

This may be one reason why the side-car has been developed. Moreover, the side car will increase the total number of persons transported by the motorcycle, since one passenger can still sit behind the pilot on the same bench while a third person sits in the side-car. Side-cars can be disconnected from their motorcycle, and thus, the motorcycle may still be used without the side-car whereby the motorcycle can be used in two different modes.

A side car conventionally consists of a frame, carried by a single ground engaging wheel carried in a vertical position, and a lateral coupling means wherein the side car of the wheel will substantially be in the travelling direction of the motorcycle-side car vehicle. The side car box is usually positioned laterally of the motorcycle, intermediate the rear wheel of the motorcycle and the single wheel of the side car, wherein the side car box ground clearance can be reduced. Hence, the center of gravity of the vehicle is lowered, thus increasing its stability/handling properties. Additionally, this permits to desirably increase the overall dimensions of side car wheel, e.g. by a diameter of a value equal to that of the rear wheel of the motorcycle: a wheel having a large diameter improves the road going comfort of the vehicle, as is well known.

In the early types of side cars, their frames were fixedly secured to the associated motorcycle frames, thereby requiring modification in the motorcycle handling negotiates a bend, since the motorcycle could not then roll inside the curve. Moreover, vehicle stability was compromised in turns, since the radius of curvature of the motorcycle front wheel and of the side car wheel were substantially different from one another because they were laterally spaced apart, particularly when the motorcycle was changing speeds.

In view thereof, jointed couplings of the deformable parallelogram type were developed, to bias the side car wheel to laterally roll concurrently with the motorcycle rear wheel, in the same direction, when the vehicle in motion negotiation a bend. Such a vehicle is described e.g. in U.S. Pat. No. 4,385,770 issued in 1983. A problem with such an arrangement is that the side car box, and thus its passenger, cannot roll with the wheel inside the curve, contrarily to the motorcycle frame and to the pilot who will be able to roll with the wheels of the motorcycle. Thus, a non-negligeable part of the moving vehicle load negotiation a bend, will sustain a centrifugal load that increases as the lateral inclination (roll) of the side car wheels and motorcycle wheels is pronounced, leading to a drastic reduction in the handling and stability of the vehicle, particularly during lateral wind drafts. Indeed, the motorcycle pilot may compensate the centrifugal force applied onto the motorcycle, during bend negociation, by a centripetal force generated by the roll inclination interiorly of the curve of the vehicle path, i.e. the displacement of its center of gravity to the interior of the tangential point of contact of the motorcycle wheels with the ground. On the other hand, since the side car box is locked into an intermediate position sunk between the side car wheel and the motorcycle rear wheel, it is impossible for the side-car passenger who would like to contribute in the stabilization of the vehicle (by laterally shifting his weight on the interior side of the curve of the vehicle in motion) to effectively compensate for the centrifugal force applied onto the side car box, because he cannot, in his seating position within the side car box, shift his weight, and thus the center of gravity of the side car, on the other side of the side car wheel or of the rear wheel of the motorcycle, depending on the respective side of the motorcycle roll inclination.

OBJECTS OF THE INVENTION

The gist of the invention is therefore to provide a motorcycle side car, whose box overlies the side car wheel directly thereabove.

A supplemental object of the invention is to provide such a side car, which will have a lateral, easily removable motorcycle coupling such that the side car wheel may rollingly incline interiorly of a bend negotiates by the vehicle in motion, wherein the side car box will roll with the side car wheel so as to remain continuously directly thereabove.

Another object of the invention is that the side car coupler be such that it be able to reduce the roll inclination relative to that of the motorcycle rear wheel, increasingly as the roll inclination of the vehicle becomes pronounced.

A general object of the invention is that the hereinabove side-car be adapted to existing motorcycles, without requiring important modifications for its installation thereon.

SUMMARY OF THE INVENTION

Accordingly, there is provided in accordance with the invention a side-car for a motorcycle, wherein the side-car box overlies the side-car wheel directly thereabove. The lateral coupling between the side-car and the motorcycle biases the side-car wheel to roll interiorly of the curve, together with the motorcycle wheels, when the moving vehicle negotiates a bend on a road. The side-car frame and box axially roll with the wheel, whereby the side-car center of gravity remains continuously within the plane of its wheel. As the motorcycle wheels progressively axially roll, their angular value relative to the vertical plane will increase relative to a second angular value corresponding to the roll of the side-car wheel relative to the vertical plane.

The invention thus concerns a vehicle assembly comprising a lateral coupling device enabling the coupling of a first vehicle laterally of a second vehicle, said first vehicle consisting of a frame carried over ground by a single wheel; said second vehicle consisting of a frame carried between a front guiding wheel and a rear driving wheel, and control means for guiding said front wheel; said coupling device comprising a rigid, removable, jointed member, laterally pivotally interconnecting the frame of both vehicles spacedly from one another, about said rear wheel wheel, while continuously clearing the ground onto which is destined to roll the vehicle assembly thus coupled; wherein: (a) said jointed member biases said single wheel of the first vehicle to remain upright and vertical, when said rear wheel of said second vehicle is upright and vertical, and to rollingly incline on the same side as said rear wheel when the latter laterally roll as will happen when said vehicle assembly negotiates a bend at a certain speed; and wherein: (b) said first vehicle further comprises a seat member, and anchoring means to fixedly secure said seat member to said first vehicle frame, directly above said single wheel, so as to enable a person to sit onto said seat member and to remain there in total safety and comfort, when said vehicle assembly rolls on a road, in any normal road-going condition and particularly when said moving vehicle assembly negotiates a bend having a large radius of curvature; the center of gravity of said side car remaining continuously within the plane of said single wheel interiorly of an operative range of roll inclination values of this single wheel.

The invention is more specifically directed to a side car designed to be laterally connected to a motorcycle and comprising: (a) a wheel; (b) a frame carried by said wheel and designed to be connected to a motorcycle by coupling means; (c) a box, secured to said frame for accomodating a passenger in total safety, said box spacedly overlying said wheel, said box defining a center of gravity remaining within the plane extending through said wheel; and (d) pivot means, operative onto said frame and sensitive to said coupling means whereby, once the motorcycle is laterally inclined, said pivot means biases said wheel and said box to roll in the same direction as the motorcycle; wherein said center of gravity of the box continuously remains within the plane of said wheel, interiorly of an operative range of inclination values of this side car.

BRIEF DESCRIPTION OF THE DRAWINGS

FIGS. 1-2 show a motorcycle onto which a side-car has been laterally coupled with a coupling frame according to the invention, respectively in side elevation and in front elevation, a pilot and his passenger (in the side-car) being also shown;

FIG. 3, and FIG. 4 at an enlarged scale, schematically show in front elevation, the vehicle comprising the coupling frame of the side car accordingly with the invention, suggesting in what fashion the coupling frame behaves as is inclined the motorcycle rear wheel (illustrated in phantom lines);

DETAILED DESCRIPTION OF THE INVENTION

Figure 5:
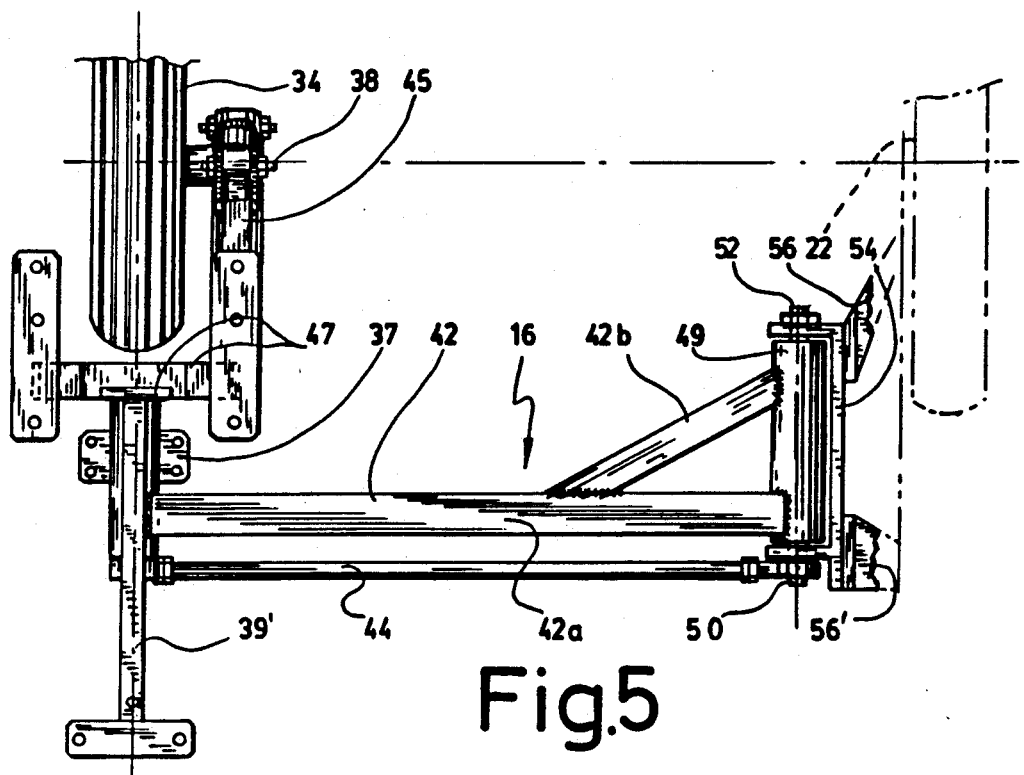
FIG. 5 is a top plan view of the coupling frame shown in FIG. 4, with the associated parts of the side car and of the motorcycle.

Vehicle 10 shown in FIGS. 1-2 consists of a motorcycle 12, a side car 14 and a coupling means 16 connecting the side car laterally to the motorcycle 12. The motorcycle 12 conventionally comprises a rigid frame 18, forwardly carried by a free, front guiding wheel 20 and rearwardly by a rear, driving wheel 22. The axle 24 of each wheel 20, 22 is connected to the frame 18 by a support fork 26 having as is known a suspension member 28. The pilot C sitting on a seat anchored to frame 18, between the two wheels 20, 22, controls his vehicle with a front control handle and brings same into motion thanks to known motor means, not shown, rotatingly driving the rear wheel 22.

The side-car 14 conventionally comprises a box or cockpit 32, designed to support and at least partially enclose a passenger P, a single wheel 34, a support frame 36 carrying the cockpit 32 onto the axle 38 of the wheel 34, and a suspension member 40. A seat 41 is normally installed to the frame 36 interiorly of the box 32.

The coupling frame 16 connects the side car frame 36 to the motorcycle frame 18, by extending substantially parallel to the ground, with a ground clearance large enough for any normal driving condition. The side car 14 is usually positioned substantially in transverse register with the rear wheel 22.

Figure 6:
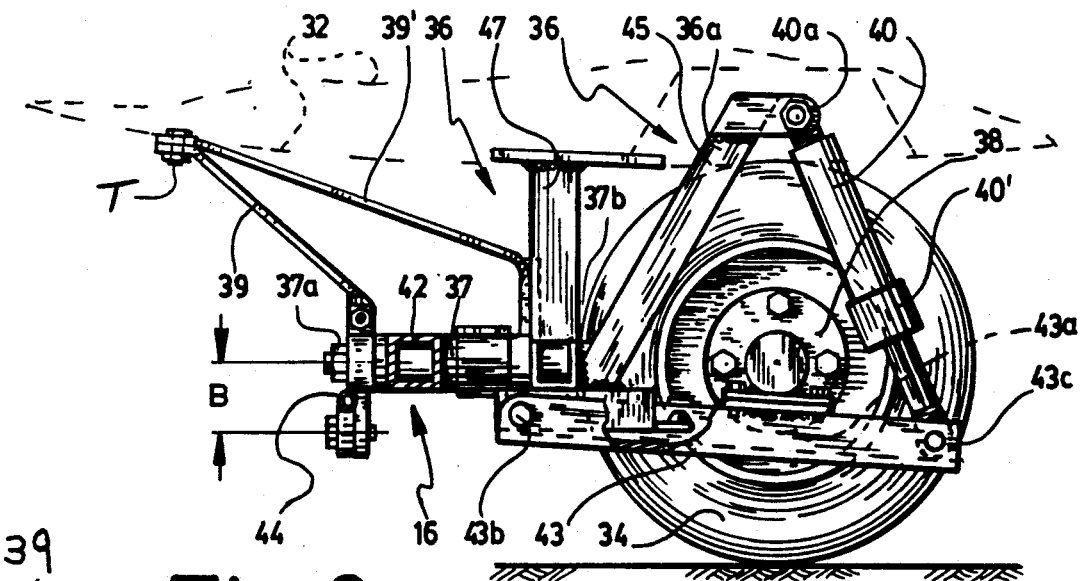
FIG. 6 is a transverse section along lines 6—6 of FIG. 4.
Figure 7:
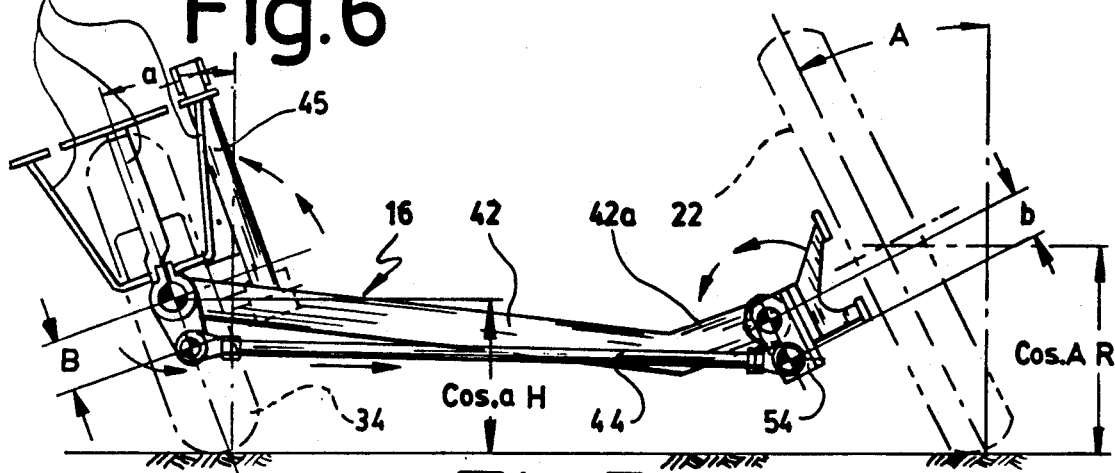
FIGS. 7-8 are views similar to that of FIGS. 3-4, illustrating the range of possible roll inclinations of the side-car and motorcycle wheels.

The side car frame 36 is best shown in FIG. 6. Frame 36 comprises a main body 37, having a front portion 37a further comprising a suspension metal leaf 39 anchored by bolt T to the bottom of box 32 at a forward portion thereof. The rear portion 37b of body 37 of support frame 36 comprises a second suspension metallic leaf plate 39' whose outer end merges with the first leaf plate 39 to be anchored to the box 32 with the same bolt T. The rear portion 37b also supports a few strong feet 47 (FIG. 7) which extend forwardly of the wheel 34 and on one and the other side thereof, to fixedly engage and support the bottom of box 32. An arm 43 is anchored at its intermediate portion to the axle 38 of wheel 34, at 43a; is pivoted at its front end to the rear portion 37b of body 37 of frame 36, at 43b; and is pivoted at its rear end to the piston 40' of a dampening ram 40, at 43c. The upper end of ram 40 is pivoted at 40a to the bottom of box 32, and anchored to frame 36 by an arm 45 which fixedly engages the rear portion 37b of the frame. The triangular structure thus constituted: 43, 45, 40, laterally clears wheel 34, so as not to interfere with its free rotation, and will roll with the frame 36 and the box 32 as the side car coupled to the motorcycle will roll therewith. The pivotal axles 40a, 40b are substantially parallel to axle 38 of wheel 34.

Accordingly with the invention, the coupling frame 16 consists of a rear bar 42 and of a front stem 44. As is well shown in FIGS. 4, 5, 7 and 8, bar 42 and stem 44 are endwisely pivoted at 46, 48 respectively, to a rigid part 37 of frame 36 of wheel 34, within the plane of wheel 34 frontwardly thereof, the pivotal axis 46 of bar 42 being above the pivotal axle 48 of stem 44 and remaining substantially within the horizontal plane intersecting the axle 38 of the wheel 34. The pivotal axles 46, 48 are parallel to the travel path of the vehicle, and remain exactly within the plane of the wheel 34, even if the latter is upright (FIG. 4) or rollingly inclined on one or the other side (FIGS. 7-8) as happens when the vehicle 10 negotiates a bend. The distance B between the pivotal axles 46, 48 is constant (FIG. 6), even if their vertical distance change as a function of the inclination of the wheel 34, as is suggested in FIGS. 7-8.

The opposite ends of the bar 42 and of the stem 44 also carry pivot members 50, 52 pivotally mounted into a front casing 54 integral to anchoring arms 56, which are anchored to the frame 18 of the motorcycle 12 on the interior side of the rear wheel 22 in register with the axle thereof.

The bar 42 comprises a diverging arm 42a its end proximate the wheel 22, the bar 42 and its reinforcing arm 42b being welded to a hollow cylinder 49 freely engaging the pivotal stud 52. The casing 54 comprises end lugs 54a which maintain cylinder 49 in its position onto the stud 52. The anchoring casing 54 is also anchored by front arms 56 to the intermediate portion of the frame 18 of the motorcycle (FIG. 1) e.g. under the engine, forwardly of the rear wheel 22 of the motorcycle.

The various anchoring means herein described may be of any suitable type, e.g. by welding. Bar 42 and stem 44 should be made from a sturdy material, which will not yield to all but the most important of torsional biasing forces. Noteworthy, bar 42 is the part of the coupling member which supports almost all the load sustained by the coupling means between the side car and the motorcycle, whereas the front stem 44 only guides and controls the pivotal motion of the bar 42 when the side car becomes laterally inclined (axially rolls).

The pivotal axles 50, 52 are parallel to the pivotal axles 46, 48 and will remain as such, and this is true for an upright wheel 22 (FIG. 4) or a laterally inclined wheel (FIGS. 7-8), as it would become when the motorcycle negotiates a bend. The upper and lower pivots 50, 52 are spaced by a fixed value b (FIG. 7), even if their vertical distance changes accordingly with the inclination of the wheel 22. The spacing b is smaller than the spacing B (FIG. 4).

Figure 4:
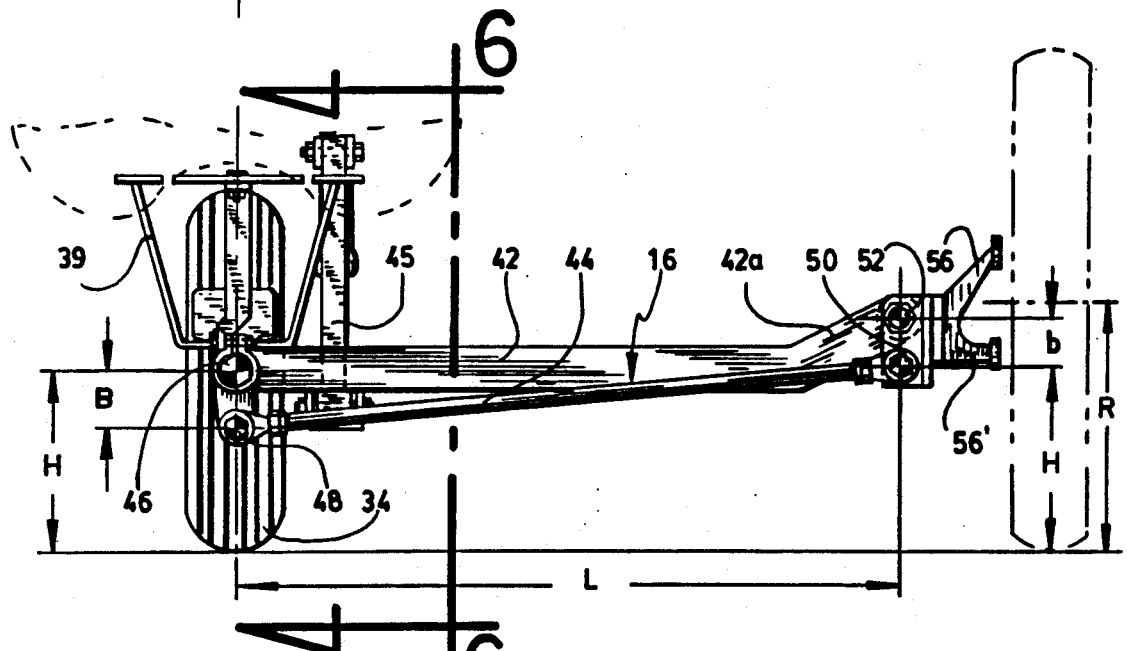
Figure 8:
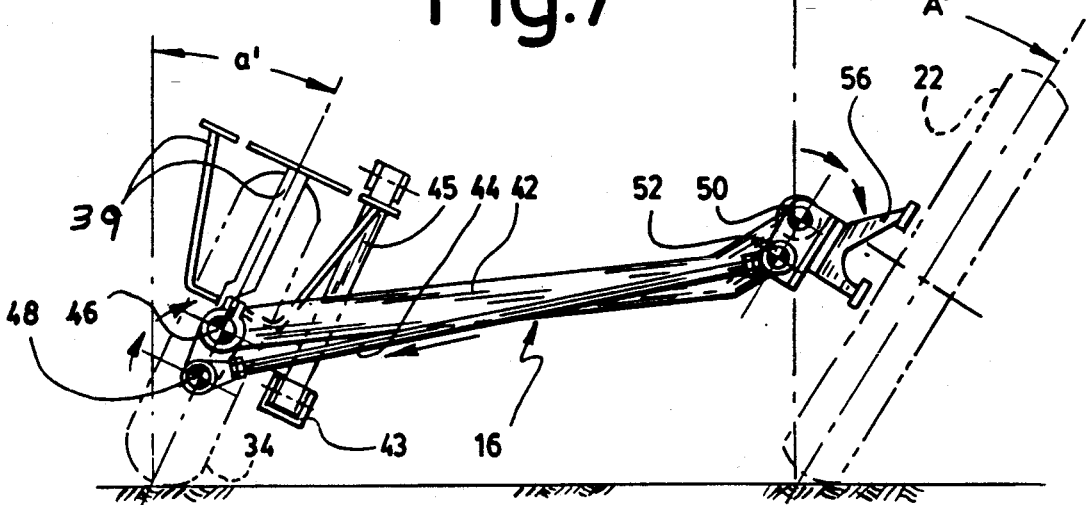

Since the motorcycle wheel 22 is diametrally larger than the side car wheel 34, the pivotal assembly 50, 52 will be upwardly offset relative to the pivotal assembly 46, 48 at least when the wheels 34, 22 are upright (vertical), see FIG. 4, and preferably, the pivots 46, 50 remain within the same horizontal plane. Accordingly with a feature of the invention, the bar 42 is upwardly elbowed about the end segment 42a, pivoted about axis 52. The angle of inclination and the length of bar section 42a are such that, relative to the upright condition of wheels 22, 34 (FIG. 4), when the motorcycle 12 is inclined interiorly (on the side of side-car, cf FIG. 7), by an angular value a, the wheel 34 will be inclined on the same side by an angular value a such that a is smaller than A. The two pivots 50, 52 will then both be shifted beneath the horizontal plane intersecting the wheel axle 34, with the lower pivotal axle 52 located exteriorly of the upper pivotal axle 50, in a strongly inclined fashion. Similarly, when motorcycle 12 is exteriorly inclined, i.e. on the opposite side of side-car (FIG. 8) by an angle A', the wheel 34 will be inclined on the same side by an angular value a' such that a' is smaller than A'. This can be explained by the fact of the difference of spacing between the two pivotal axles of each pair, b smaller than B, and by the elbow 42a. Thus, the angular value (A-a) will become increasingly larger as the vehicle inclination will be important, and similarly for the angular value (A'-a'). In FIG. 8, the two pivotal axles 50, 52 will then both be shifted above the horizontal plane intersecting the axle of the side car inclined wheel 34, whereas the lower pivotal axle 52 will then have been transferred interiorly of the level of the upper pivot axle 50 (relative to the side-car).

Consequently, the figure formed by the members 42, 46, 48, 44, 50 and 52 constitute approximately a quadrangular shape (not taking in consideration elbow 42a), i.e. at least a trapezoidal shape and, when wheels 34, 22 are upright, vertical and thus parallel to one another, said figure then forms a (deformable linkage) parallelogram shape. It can thus be said that the coupling 16 constitutes one alternate mode of the known "deformable parallelogram" linkage coupling mentioned in the above Background of the invention paragraph, but a mode which substantially improves the performances of the vehicle 10 in an unexpected fashion.

The angular inclination value of the wheel, a, A, and a', A', will thus be limited to a range of limit values defined as operative, e.g. of a maximum of 45° for A and similarly of 45° for A' (for a total of 90°) accordingly with safe driving conditions for the motorist C, and thus a more restricted range for a and a', e.g. 40° for a and 40° for a'.

It is understood that, as the frame 36 of side-car is conventional, installation of the coupling member 16 will be easily made. Securing the bar 42 to the stem 44 may advantageously be permanent to the level of the side-car frame 36, whereas only the anchoring joints of arms 56 of casing 54 to the axle of the rear wheel 22 and to the intermediate portion of the motorcycle frame 18 will be temporary.

It is also understood that, even if the side-car is normally designed to be used with a motorcycle, i.e. a two-wheel motor vehicle having an engine displacement greater than 125 cc, the scope of the invention would of course extend to replacing the motorcycle with any other two-wheel vehicle, e.g.: a moped, a bicycle, etc. . . It is not even necessary that the two-wheel vehicle have autonomous drive means: such a non-autonomous drive vehicle fitted with the present side-car and associated coupling means could descend a sloped road, e.g. and negotiate bends in utmost safety within the normal speed ranges.

I claim:

1. A vehicle assembly comprising a lateral coupling device enabling the coupling of a first vehicle laterally of a second vehicle, said first vehicle consisting of a frame carried over ground by a single wheel; said second vehicle consisting of a frame carried between a front guiding wheel and a rear driving wheel, and control means for guiding said front wheel; said coupling device comprising a rigid, removable, jointed member, laterally pivotally interconnecting the frame of both vehicles spacedly from one another, about said rear wheel, while continuously clearing the ground onto which is destined to roll the vehicle assembly thus coupled; wherein:

(a) said jointed member biases said single wheel of the first vehicle to remain upright and vertical, when said rear wheel of said second vehicle is upright and vertical, and to rollingly incline on the same side as said rear wheel when the latter laterally rolls as will happen when said vehicle assembly negotiates a bend at a certain speed; and wherein:

(b) said first vehicle further comprises a seat member, and anchoring means to fixedly secure said seat member to said first vehicle frame, directly above said single wheel, so as to enable a person to sit onto said seat member and to remain there in total safety and comfort, when said vehicle assembly rolls on a road, in any normal road-going condition and particularly when said moving vehicle assembly negotiates a bend having a large radius of curvature; the center of gravity of said side car remaining continuously within the plane of said single wheel interiorly of an operative range of roll inclination values of this single wheel.

2. A vehicle assembly as defined in claim 1, wherein said single wheel of first vehicle is of a diameter substantially smaller than that of said rear wheel of second vehicle.

3. A vehicle assembly as defined in claim 2, wherein said single wheel of first vehicle is of a diameter about half that of said rear wheel of second vehicle.

4. A vehicle assembly as defined in claim 1, wherein said second vehicle is a motorcycle and said first vehicle is used as a side-car with said motorcycle.

5. A vehicle assembly as defined in claim 1, wherein said jointed member comprises pivot means, said pivot means being operative on said frame of first vehicle when said rear wheel of second vehicle is laterally inclined, said pivot means creating a non-zero difference of inclination values between the rolling inclination of said single wheel of first vehicle relative to that of said rear wheel of second vehicle, said difference of inclination values progressively increasing as said rear wheel of second vehicle progressively tilts toward a horizontal plane.

6. A vehicle assembly as defined in claim 5, wherein said jointed member consists of a lever system having a generally trapezoidal shape, comprising two first and second, elongated, rigid, lever members, said first lever member being pivoted by a first pivotal axle at one end to said frame of first vehicle, and by a second pivotal axle at its outer end to said frame of second vehicle, said second lever member being pivoted by a third pivotal axle at one end to said frame of first vehicle and by a fourth pivotal axle at its other end to said frame of second vehicle, said first and third pivotal axles on said frame of first vehicle being spaced by a value D and said second and fourth pivotal axles on said frame of second vehicle being spaced by a value d, such that D is larger than d; said first to fourth pivotal axles being parallel to one another and oriented in a fore-and-aft direction relative to the travel path of said vehicle assembly.

7. A vehicle assembly as defined in claim 6, wherein said first lever member overlies the second lever member and comprises an upwardly elbowed end portion about said frame of second vehicle.

8. A vehicle assembly as defined in claim 6, wherein said first and third pivotal axles are positioned frontwardly spacedly ahead of said single wheel of first vehicle, within its plane, whereas said second and fourth pivotal axles are carried substantially laterally in closely spaced register with said rear wheel of second vehicle, between the latter and the wheel of first vehicle.

9. A vehicle assembly as defined in claim 8, wherein said first pivotal axle is located above said second pivotal axle, and comes in substantial register with the axle of said single wheel of first vehicle.

10. A vehicle assembly as defined in claim 6, wherein said third and fourth pivotal axles are upwardly offset relative to the horizontal plane extending through the axle of said single wheel of first vehicle, when said vehicle wheels are exteriorly inclined relative to said second vehicle i.e. on the side of said second vehicle, but downwardly offset from this horizontal plane, when said wheels are inclined on the exterior side of said first vehicle.

11. A side car designed to be laterally connected to a motorcycle and comprising:
   (a) a wheel;
   (b) a frame carried by said wheel and designed to be connected to a motorcycle, said frame defining front and rear ends;
      (bb) first and second coupling means, spaced apart from one another along the fore and aft axis of said frame, for interconnecting said side car frame to a motorcycle, wherein said first coupling means is completely detached and spaced from and free to move relative to said second coupling means;
   (c) a box, secured to said frame for accommodating a passenger in total safety, said box spacedly overlying said wheel, said box defining a center of gravity remaining within the plane extending through said wheel;
   (d) first and second pivot means, operative onto said frame and sensitive to said first and second coupling means, respectively, whereby, once the motorcycle is laterally inclined, said pivot means biases said wheel and said box to roll in the same direction as the motorcycle; said center of gravity of the box continuously remaining within the plane of said wheel, interiorly of an operative range of inclination values of this side car; and
   (e) jointed means such that a non-zero difference of the inclination values is defined between the inclination of the side-car and the inclination of the motorcycle, said difference in inclination values increasing progressively as said motorcycle progressively tilts towards a horizontal plane.

* * * * *